United States Patent [19]
Sasaki

[11] Patent Number: 5,781,808
[45] Date of Patent: Jul. 14, 1998

[54] ZOOM-LENS DRIVE CONTROL APPARATUS

[75] Inventor: Tadashi Sasaki, Omiya, Japan

[73] Assignee: Fuji Photo Optical Co., Ltd., Omiya, Japan

[21] Appl. No.: 827,102

[22] Filed: Mar. 17, 1997

[30] Foreign Application Priority Data

Mar. 27, 1996 [JP] Japan .................................. 8-099001
Mar. 27, 1996 [JP] Japan .................................. 8-099002

[51] Int. Cl.⁶ .......................... G03B 13/36; G02B 7/09; G02B 7/10; G02B 7/28
[52] U.S. Cl. ............................................. 396/81
[58] Field of Search ............................. 396/79-82, 91; 359/696-698

[56] References Cited

U.S. PATENT DOCUMENTS 4,161,756   7/1979   Thomas .............................. 396/626 X

FOREIGN PATENT DOCUMENTS 8-10290   1/1996   Japan .
7-186310   1/1997   Japan .

*Primary Examiner*—W. B. Perkey
*Attorney, Agent, or Firm*—Ronald R. Snider

[57] ABSTRACT

Data output means for outputting the moving position data of respective movable lens groups in a zoom lens according to designated magnification data and object distance data is provided, thereby smoothly and easily performing the drive control operation for a zoom lens in which not only the focus-adjusting movable lens but also the power-changing movable lens is moved at the time of focus adjustment. Alternatively, reference data output means for outputting designed moving positions of the respective movable lens groups according to the designated magnification data and object distance data, as well as adjustment data output means for outputting amounts of adjustment corresponding to the individual differences of the respective lenses in the movable lens groups are provided, thereby smoothly, easily, and correctly performing the drive control operation for the zoom lens in which not only the focus-adjusting movable lens but also the power-changing movable lens is moved at the time of focus adjustment. A CPU (11) reads out the moving position data for respective movable lens groups (G2, G4) from first and second tables stored in a ROM (16) according to magnification designation data from a magnification designation operating section (12) and distance designation data from an object distance designation operating section (13), and then transmits predetermined lens drive signals to the movable lens groups (G2 and G4) according to these moving position data. Alternatively, a CPU (111) reads out the moving position reference data for the respective movable lens groups (G2, G4) from first and second tables stored in a ROM (116) according to magnification designation data from a magnification designation operating section (112) and distance designation data from an object distance designation operating section (113), reads out moving position adjustment data for the respective movable lens groups (G2, G4) from third and fourth tables stored in the ROM (116), and then transmits predetermined lens drive signals to the movable lens groups (G2 and G4) according to these data.

8 Claims, 9 Drawing Sheets

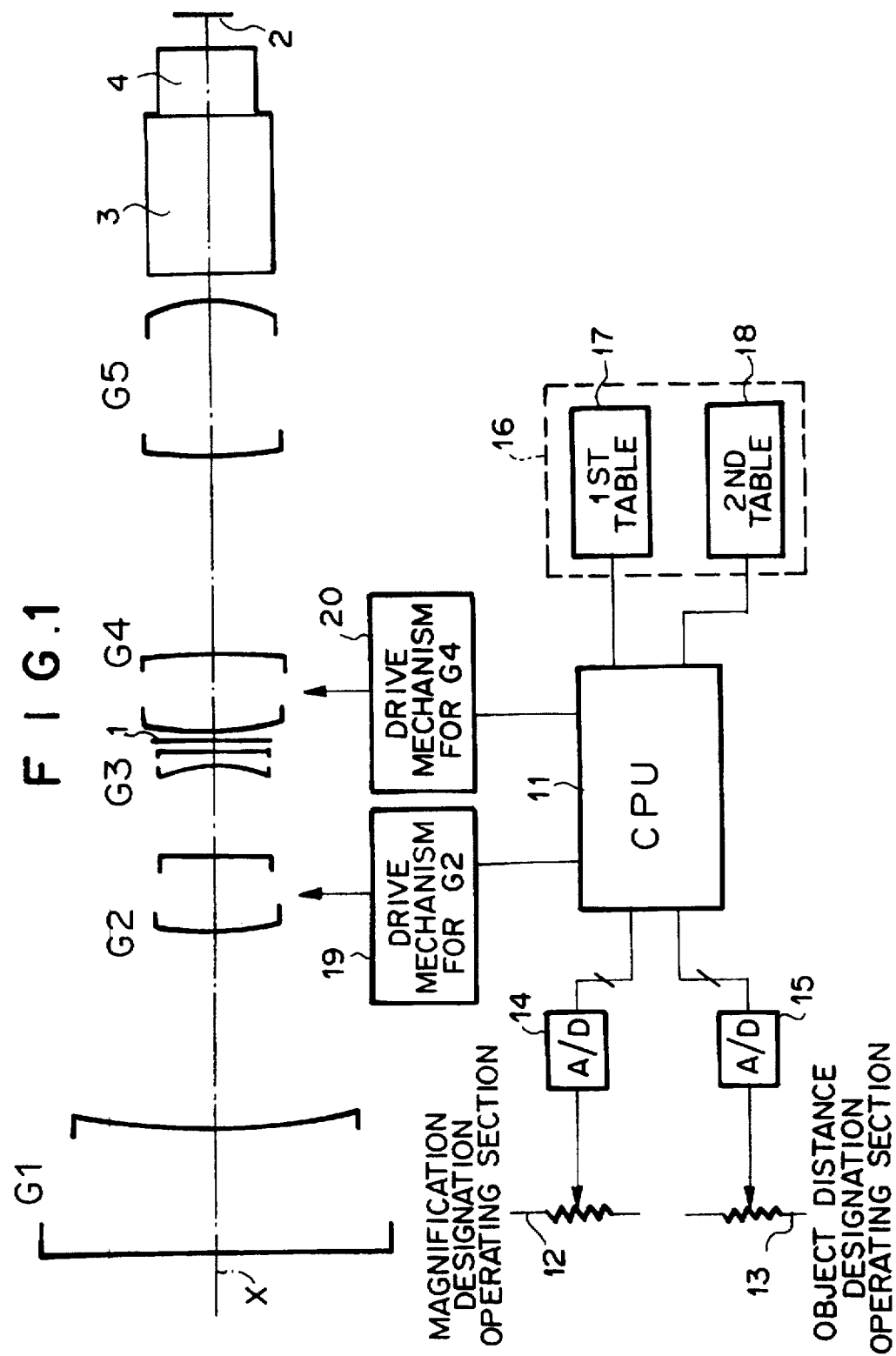

FIG. 2A

1ST TABLE (FOR MOVING G2)

| MAGNIFICATION \ DISTANCE | 0m | 1m | 2m | ... | ∞ |
|---|---|---|---|---|---|
| 1 | $P_{1,0}$ | $P_{1,1}$ | $P_{1,2}$ | ... | $P_{1,\infty}$ |
| 2 | $P_{2,0}$ | $P_{2,1}$ | $P_{2,2}$ | ... | $P_{2,\infty}$ |
| ... | | | | | |
| 10 | $P_{10,0}$ | $P_{10,1}$ | $P_{10,2}$ | ... | $P_{10,\infty}$ |
| 20 | $P_{20,0}$ | $P_{20,1}$ | $P_{20,2}$ | ... | $P_{20,\infty}$ |

FIG. 2B

2ND TABLE (FOR MOVING G4)

| MAGNIFICATION \ DISTANCE | 0m | 1m | 2m | ... | ∞ |
|---|---|---|---|---|---|
| 1 | $Q_{1,0}$ | $Q_{1,1}$ | $Q_{1,2}$ | ... | $Q_{1,\infty}$ |
| 2 | $Q_{2,0}$ | $Q_{2,1}$ | $Q_{2,2}$ | ... | $Q_{2,\infty}$ |
| ... | | | | | |
| 10 | $Q_{10,0}$ | $Q_{10,1}$ | $Q_{10,2}$ | ... | $Q_{10,\infty}$ |
| 20 | $Q_{20,0}$ | $Q_{20,1}$ | $Q_{20,2}$ | ... | $Q_{20,\infty}$ |

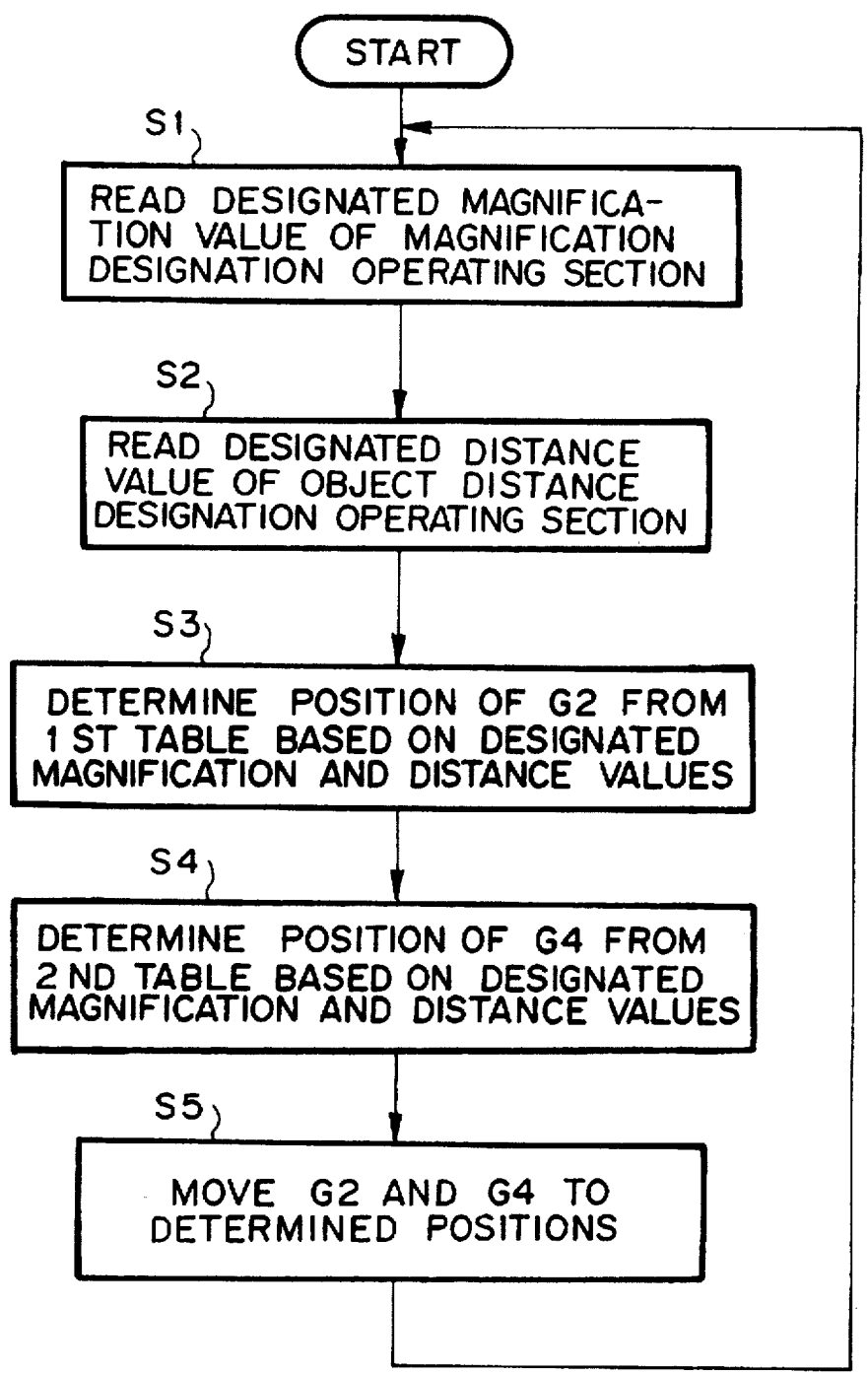

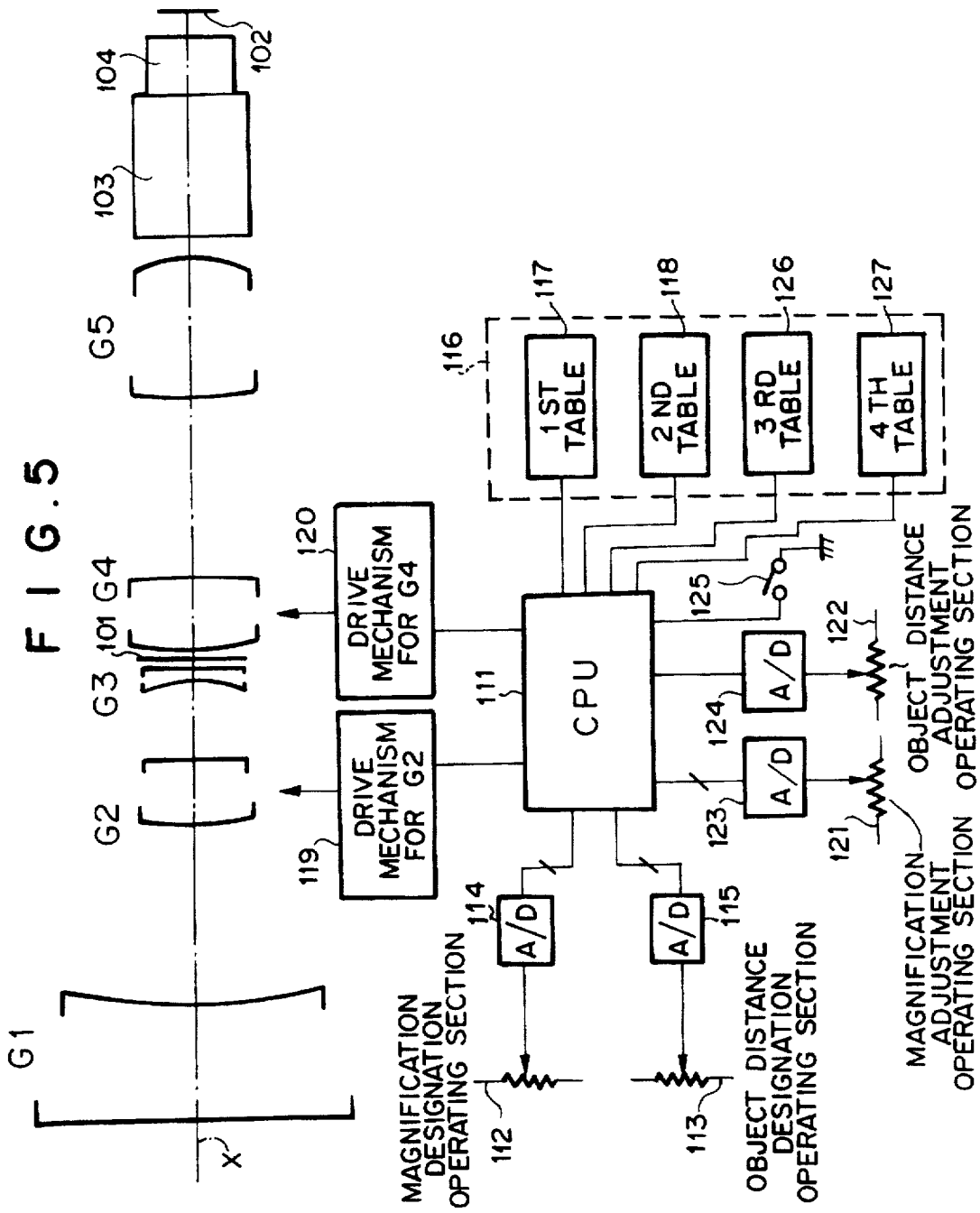

FIG. 6A
1ST TABLE (FOR REFERENCE POSITION OF G2)

| MAGNIFICATION \ DISTANCE | 0m | 1m | 2m | .... | ... | ∞ |
|---|---|---|---|---|---|---|
| 1 | $P_{1,0}$ | $P_{1,1}$ | $P_{1,2}$ | | | $P_{1,\infty}$ |
| 2 | $P_{2,0}$ | $P_{2,1}$ | $P_{2,2}$ | | | $P_{2,\infty}$ |
| : | | | | | | |
| 10 | $P_{10,0}$ | $P_{10,1}$ | $P_{10,2}$ | | | $P_{10,\infty}$ |
| 20 | $P_{20,0}$ | $P_{20,1}$ | $P_{20,2}$ | | | $P_{20,\infty}$ |

FIG. 6B
2ND TABLE (FOR REFERENCE POSITION OF G4)

| MAGNIFICATION \ DISTANCE | 0m | 1m | 2m | .... | .... | ∞ |
|---|---|---|---|---|---|---|
| 1 | $Q_{1,0}$ | $Q_{1,1}$ | $Q_{1,2}$ | | | $Q_{1,\infty}$ |
| 2 | $Q_{2,0}$ | $Q_{2,1}$ | $Q_{2,2}$ | | | $Q_{2,\infty}$ |
| : | | | | | | |
| 10 | $Q_{10,0}$ | $Q_{10,1}$ | $Q_{10,2}$ | | | $Q_{10,\infty}$ |
| 20 | $Q_{20,0}$ | $Q_{20,1}$ | $Q_{20,2}$ | | | $Q_{20,\infty}$ |

FIG. 6C
3RD TABLE (FOR ADJUSTING G2)

| MAGNIFICATION \ DISTANCE | 0m | 1m | 2m | .... | ... | ∞ |
|---|---|---|---|---|---|---|
| 1 | $R_{1,0}$ | $R_{1,1}$ | $R_{1,2}$ | | | $R_{1,\infty}$ |
| 2 | $R_{2,0}$ | $R_{2,1}$ | $R_{2,2}$ | | | $R_{2,\infty}$ |
| : | | | | | | |
| 10 | $R_{10,0}$ | $R_{10,1}$ | $R_{10,2}$ | | | $R_{10,\infty}$ |
| 20 | $R_{20,0}$ | $R_{20,1}$ | $R_{20,2}$ | | | $R_{20,\infty}$ |

FIG. 6D
4TH TABLE (FOR ADJUSTING G4)

| MAGNIFICATION \ DISTANCE | 0m | 1m | 2m | .... | .... | ∞ |
|---|---|---|---|---|---|---|
| 1 | $S_{1,0}$ | $S_{1,1}$ | $S_{1,2}$ | | | $S_{1,\infty}$ |
| 2 | $S_{2,0}$ | $S_{2,1}$ | $S_{2,2}$ | | | $S_{2,\infty}$ |
| : | | | | | | |
| 10 | $S_{10,0}$ | $S_{10,1}$ | $S_{10,2}$ | | | $S_{10,\infty}$ |
| 20 | $S_{20,0}$ | $S_{20,1}$ | $S_{20,2}$ | | | $S_{20,\infty}$ |

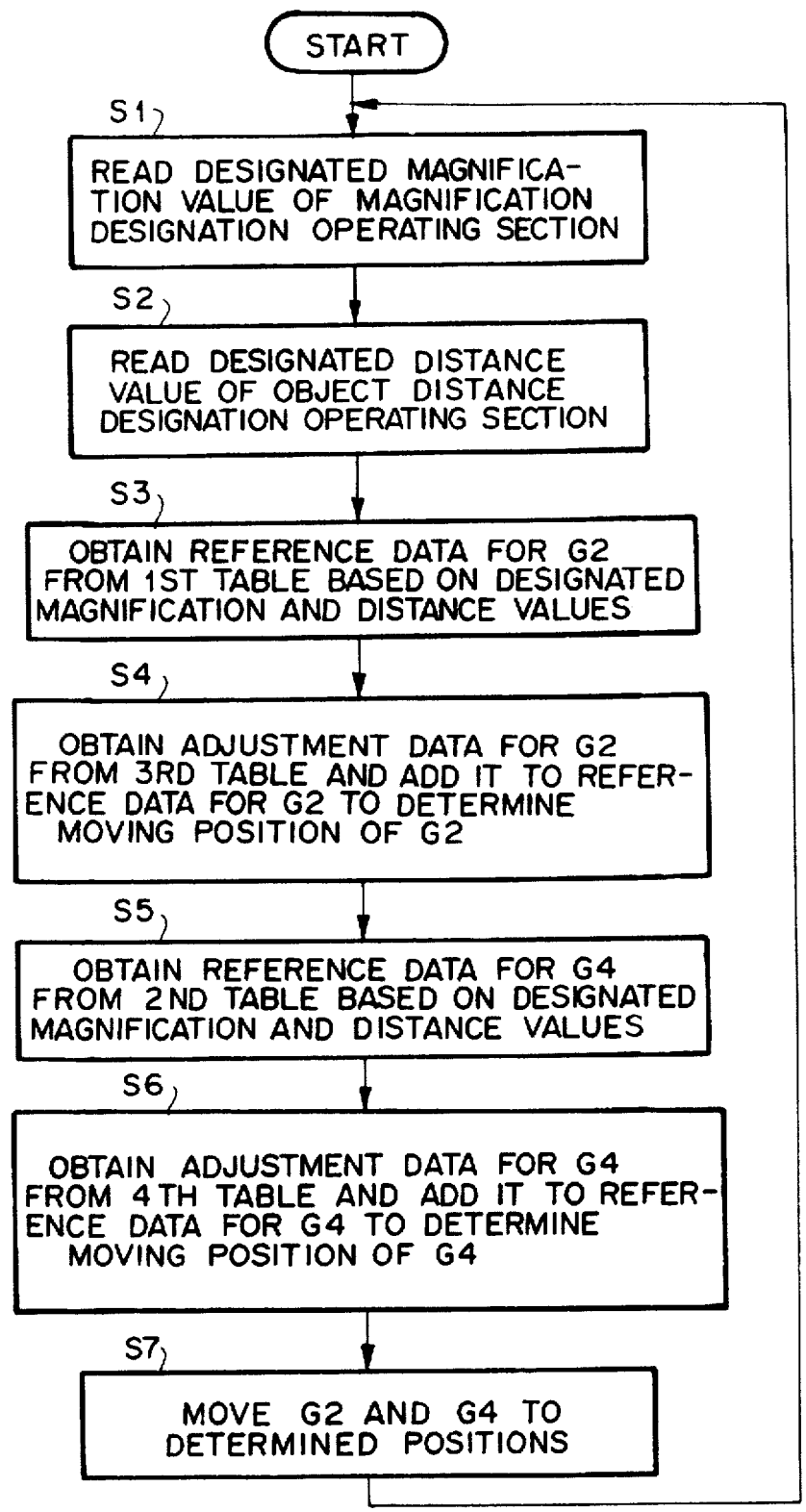

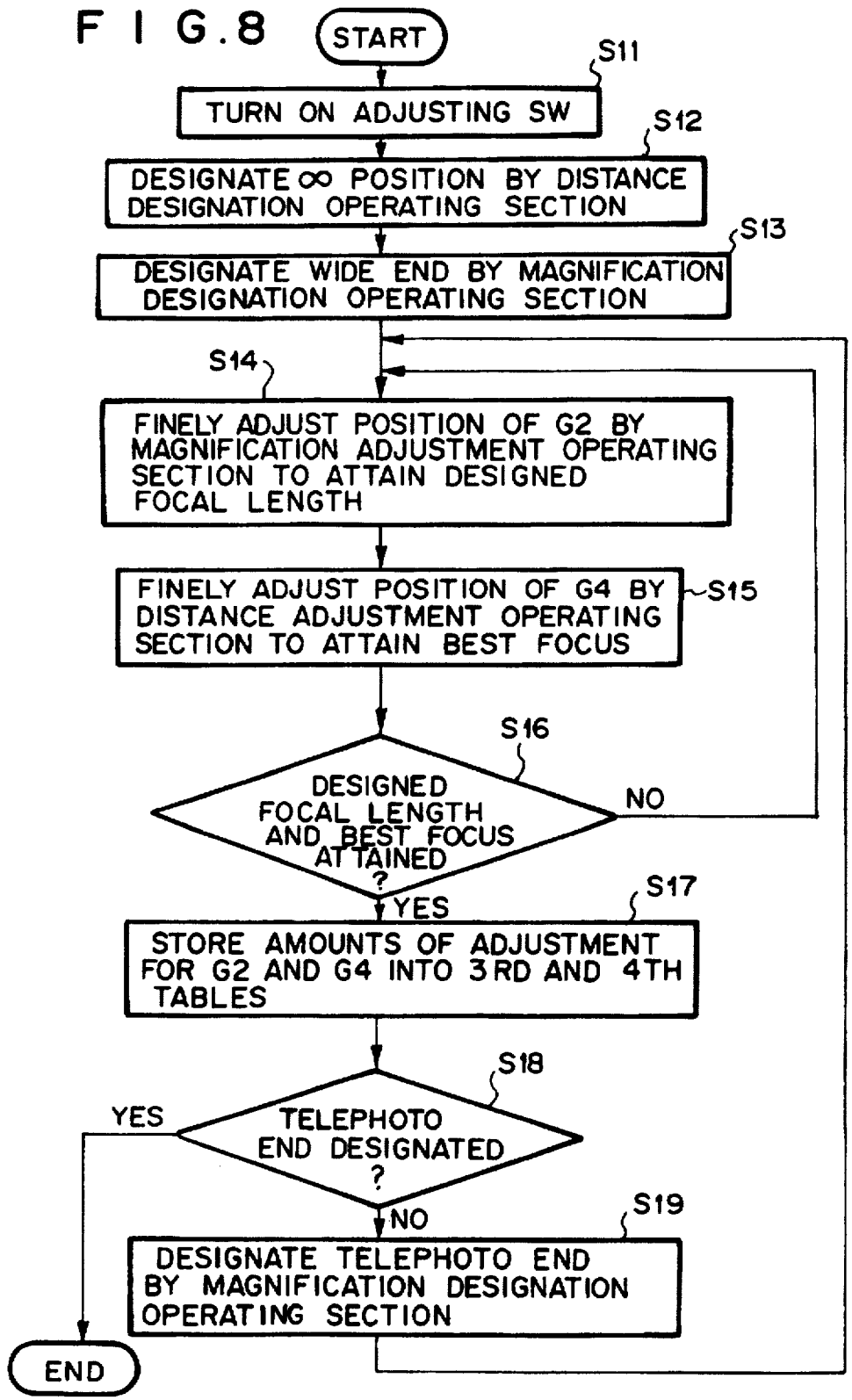

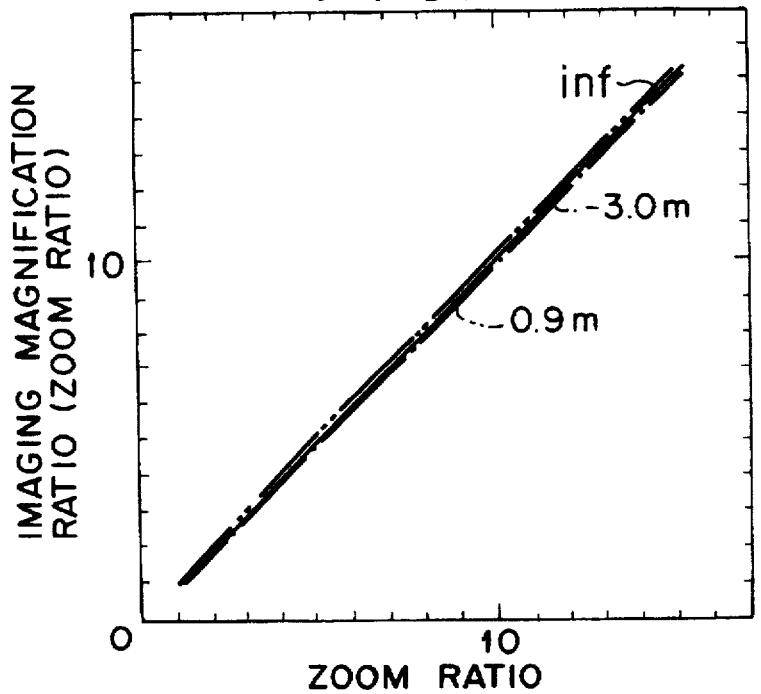
FIG.9 CHANGE IN MAGNIFICATION ACCORDING TO OBJECT DISTANCE (EMBODIMENT)
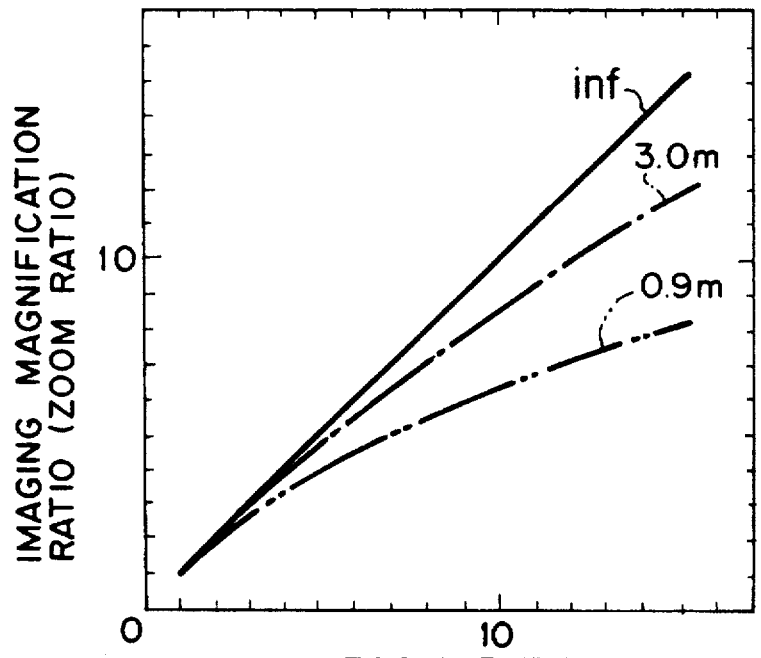
FIG.10 CHANGE IN MAGNIFICATION ACCORDING TO OBJECT DISTANCE (PRIOR ART)

ZOOM-LENS DRIVE CONTROL APPARATUS

RELATED APPLICATIONS

This application claims the priority of Japanese Patent Application Nos. 8-99001 and 8-99002 both filed on Mar. 27, 1996, which are incorporated herein by reference.

BACKGROUND OF THE INVENTION

1. Field of the Invention

The present invention relates to a drive control apparatus for zoom lens and, in particular, to a zoom-lens drive control apparatus which independently drives and controls the power-changing movable lens group and focus-adjusting movable lens group in a zoom lens of TV camera for broadcasting or business use.

2. Description of the Prior Art

In a zoom lens, variable power ratio, which is generally known as zoom ratio, is represented by the ratio of the focal length of the whole lens system at its wide-angle end to that at its telephoto end in the case where the object distance is at infinity. In most of the conventional zoom lenses, the focus-adjusting mechanism is placed between the power-changing mechanism and the object. In such a configuration, even when the object distance is finite, the ratio of the imaging magnification at the wide-angle end to that at the telephoto end coincides with the zoom ratio expressed as above, whereby it has been sufficient for the zoom ratio at any position of the subject object from close range to infinity to be represented by the above-mentioned ratio of the focal lengths.

On the other hand, recently has come into use is so-called rear-focus type zoom lens whose focus-adjusting mechanism is placed between the power-changing mechanism and the image.

When the zoom ratio of such a type of zoom lens is represented by the ratio of focal length of the whole lens system at its wide-angle end to that at its telephoto end in the case where the object distance is at infinity, however, the ratio of imaging magnification at the wide angle end to that at the telephoto end in the case where the object position is at a finite distance differs from the above-mentioned zoom ratio.

Known among this kind of zoom lens is one constituted, successively from the object side, by five lens groups respectively having positive, negative, negative, positive, and positive refractive powers; in which, while each of the first, third, and fifth lens groups is fixed, the second lens group is moved in the optical axis direction so as to correct fluctuation in imaging position, and the fourth lens group is moved in the optical axis direction so as to correct the fluctuation in imaging position. In this zoom lens, when the total amount of movement of the second lens group is fixed at the time of zooming regardless of the object distance, as shown in FIG. 10, the actual imaging magnification ratio remarkably decreases from the above-mentioned focal length ratio as the zooming shifts from the wide-angle end to the telephoto end.

Namely, in cases where the zoom lens is actually used, when zooming is made in a state where the zoom lens is close to the subject, the subject image cannot be magnified to an expected degree.

In order to overcome such a problem, the applicant has proposed a zoom lens in which the total amount of movement of the lens group contributory to variable power is changed in response to the distance to the subject object such that the ratio of imaging magnification at the wide-angle end to that at the telephoto end upon zooming in cases where the object distance is finite coincides with the ratio of focal length of the whole lens system at the wide-angle end to that at the telephoto end in cases where the object distance is at infinity (Japanese Patent Application No. 7-186310).

Thus, in the above-mentioned zoom lens, not only the focus-adjusting movable lens group but also the power-changing movable lens group is moved in order to perform a focus-adjusting operation.

When each movable lens group is driven and controlled in this manner, unlike the other prior art, it is difficult to definitely determine the position to which the power-changing movable lens group is moved.

Accordingly, in order to drive and control each movable lens group of the above-mentioned zoom lens, a lens drive control apparatus corresponding to the lens configuration is necessary.

The moving position of each movable lens group constituting the zoom lens is determined on the basis of designed values of the lens group which are calculated according to target design values (target; magnification value, focus-adjusting value, aberration value, and the like).

When optical units are actually assembled, however, optical errors generally occur in each unit with respect to the above-mentioned design values. Further, in general, mechanical errors in mechanisms for supporting these optical units and electric errors in servo mechanisms for driving and controlling the movable lens groups occur in the respective units.

Accordingly, when determining the correct moving position of each movable lens group, it should be determined not on the basis of the design values of the apparatus alone but according to the values in which the individual differences (errors) of the respective units are added to the design values.

SUMMARY OF THE INVENTION

In view of the foregoing circumstances, it is an object of the present invention to provide a zoom-lens drive control apparatus which can smoothly and easily control each movable lens of a zoom lens in which not only the focus-adjusting movable lens group but also the power-changing movable lens group is moved upon focus adjustment.

It is another object of the present invention to provide a zoom-lens drive control apparatus which can smoothly and easily control each movable lens of a zoom lens, in which not only the focus-adjusting movable lens group but also the power-changing movable lens group is moved upon focus adjustment, with a high precision according to the individual differences (errors) of the lens units.

The present invention provides a drive control apparatus for a zoom lens including a power-changing movable lens group and a focus-adjusting movable lens group.

In this zoom-lens drive control apparatus, the zoom lens is driven and controlled such that the total amount of movement of the power-changing lens group from the wide-angle end to the telephoto end changes according to the distance from the subject object and that the total amount of movement of the focus-adjusting movable lens group from the near side to the infinity side changes according to the set value of variable power.

In an embodiment, the zoom-lens drive control apparatus comprises:

first data output means for outputting data concerning a position to which the power-changing movable lens group is to be moved, according to a designated value of variable power and a designated value of object distance;

second data output means for outputting data concerning a position to which the focus-adjusting movable lens group is to be moved, according to the designated value of variable power and the designated value of object distance; and lens drive control means which drives and controls, based on the output data from the first and second data output means, each of the movable lens groups such that they are moved to their corresponding data positions.

In another embodiment, the zoom-lens drive control apparatus comprises:

first reference data output means for outputting reference data concerning a position to which the power-changing movable lens group is to be moved, according to a designated value of variable power and a designated value of object distance;

first adjustment data output means for outputting adjustment data concerning the position to which the power-changing movable lens group is to be moved and corresponding to the individual difference of the zoom lens, according to the designated value of variable power and the designated value of object distance;

second reference data output means for outputting reference data concerning a position to which the focus-adjusting movable lens group is to be moved, according to the designated value of variable power and the designated value of object distance;

second adjustment data output means for outputting adjustment data concerning the position to which the focus-adjusting movable lens group is to be moved and corresponding to the individual difference of the zoom lens, according to the designated value of variable power and the designated value of object distance;

arithmetic means for operating the reference data for the power-changing movable lens group outputted from the first reference data output means and the adjustment data for the power-changing movable lens group outputted from the first adjustment data output means and operating the reference data for the focus-adjusting movable lens group outputted from the second reference data output means for the focus-adjusting movable lens group and the adjustment data for the focus-adjusting movable lens group outputted from the second adjustment data output means; and lens drive control means which drives and controls, based on the operated output data from the arithmetic means, each of the two movable lens groups such that they are moved to their corresponding data positions.

Specifically, the zoom lens comprises, successively from the object side, a first lens group having a positive refractive power, a second lens group having a negative refractive power, a third lens group having a negative refractive power, a fourth lens group having a positive refractive power, and a fifth lens group having a positive refractive power; in which the second lens group is moved in the optical axis direction so as to change the focal length of the whole lens system, and the fourth lens group is moved in the optical axis direction so as to correct the fluctuation in imaging position and correct the change in imaging position due to change in object distance. Here, as the distance from the subject object increases, the amount of movement of the second lens group from the wide-angle end to the telephoto end is decreased such that the ratio in imaging magnification at the wide-angle end to that at the telephoto end upon zooming in cases where the object distance is finite coincides with the ratio of focal length of the whole lens system at the wide-angle end to that at the telephoto end in cases where the object distance is at infinity.

In a preferred embodiment, each of the data output means is composed of a table stored in a memory.

In another preferred embodiment, each of the data output means is composed of a predetermined operation expression.

BRIEF DESCRIPTION OF THE DRAWINGS

FIG. 1 is a block diagram showing a zoom-lens drive control apparatus in accordance with a first embodiment of the present invention;

FIGS. 2A and 2B are charts conceptually representing tables shown in FIG. 1;

FIG. 3 is a flow chart showing the process of operation of CPU shown in FIG. 1;

FIG. 5 is a block diagram showing a zoom-lens drive control apparatus in accordance with a second embodiment of the present invention;

FIGS. 6A to 6D are charts conceptually representing tables shown in FIG. 5;

FIG. 7 is a flow chart showing the process of operation of CPU shown in FIG. 5;

FIG. 8 is a flow chart showing the process of operation for obtaining adjustment data to be stored in third and fourth tables shown in FIGS. 6C and 6D;

FIG. 9 is a graph showing the relationship between the change in zoom ratio and the change in imaging magnification according to the object distance when the present invention is used; and FIG. 10 is a graph showing the relationship between the change in zoom ratio and the change in imaging magnification according to the object distance when the prior art is used.

DETAILED DESCRIPTION OF THE PREFERRED EMBODIMENTS

Figure 4A:
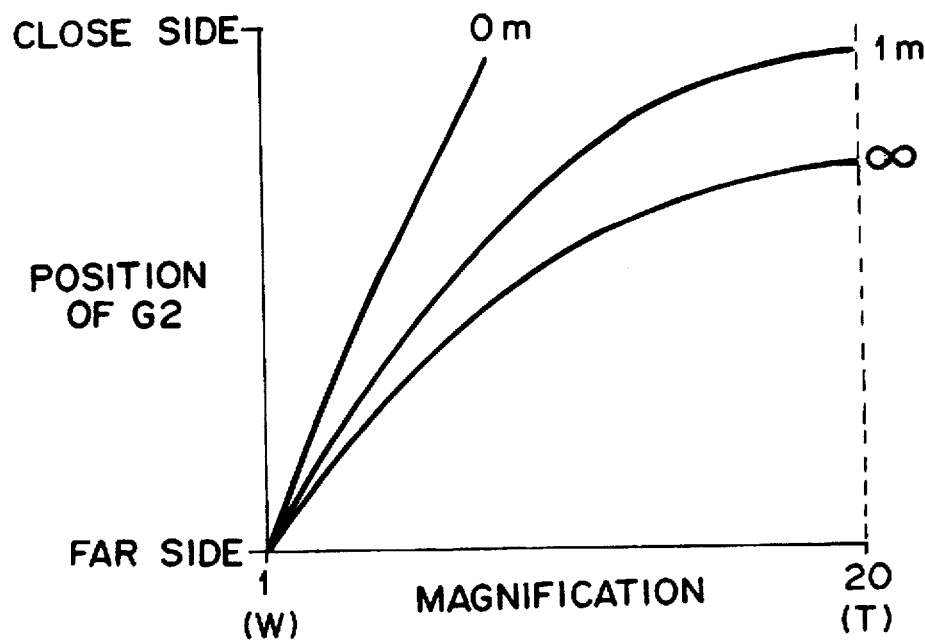
FIGS. 4A and 4B are graphs representing the relationships between data when positional data for the respective movable lens groups are determined on the basis of designated magnification data and designated object distance data.

In the following, embodiments of the present invention will be explained with reference to attached drawings.

FIG. 1 is a block diagram showing the zoom-lens drive control apparatus in accordance with a first embodiment of the present invention.

Also, FIG. 1 shows a zoom lens which is driven by this zoom-lens drive control apparatus. This zoom lens comprises, successively from the object side, a first lens group G1 having a positive refractive power as a whole, a second lens group G2 having a negative refractive power as a whole, a third lens group G3 having a negative refractive power as a whole, a stop 1, a fourth lens group G4 having a positive refractive power as a whole, and a fifth lens group G5 having a positive refractive power as a whole. While the first lens group G1, the third lens group G3, and the fifth lens group G5 are fixed, the second lens group G2 mainly having a power-changing function and the fourth lens group G4 mainly having a focus-adjusting function are made movable upon zooming.

A luminous flux emitted from this zoom lens forms an image on an imaging surface 2 by way of a three-color separating prism 3 disposed on an optical axis X between the fifth lens group G5 and the imaging surface 2, a filter for cutting infrared rays, a low-pass filter, and a CCD cover glass 4.

On the other hand, the zoom-lens drive control apparatus in accordance with this embodiment moves the second lens group G2 along the optical axis X so as to change the focal length f of the whole lens system, and moves the fourth lens group G4 along the optical axis X so as to correct the fluctuation in imaging position due to the movement of the second lens group G2.

Further, together therewith, the change in imaging position due to the change in object distance is corrected as the fourth lens group G4 is moved, and the total amount of movement of the second lens group G2 from the wide-angle end to the telephoto end is changed according to the object distance.

Namely, when the object distance is at infinity, the amount of movement of the second lens group G2 from the wide-angle end to the telephoto end is $a_1$. In this case, the lens is driven and controlled such that the fourth lens group G4 moves to a position which is closest to the image in the intermediate range of variable power whereas, at the telephoto end, it approaches the fixed third lens group G3. When the object distance is at close range, the amount of movement of the second lens group G2 from the wide-angle end to the telephoto end is $a_2$ which is greater than $a_1$. In this case, the lens is driven and controlled such that the fourth lens group G4 moves to a position which is closest to the image in the intermediate range of variable power whereas, at the telephoto end, it is driven and controlled so as to approach the fixed third lens group G3; while the distance between the two lens groups G3 and G4 is greater than that in the above-mentioned case where the object distance is at infinity.

Here, in cases where the object distance is between infinity and close range, the lens is driven and controlled such that the amount of movement of the second lens group G2 becomes a value between $a_1$ and $a_2$.

Thus, the amount of movement of the second lens group G2 from the wide-angle end to the telephoto end in the case where the object distance is at close range is greater than that in the case where the object distance is at infinity, while the fourth lens G4 is driven and controlled such that it is moved so as to correct the fluctuation in imaging position due to the movement of the second lens group G2 in each of these cases.

As the second lens group G2 and the fourth lens group G4 are driven and controlled in this manner, at any position of the object between infinity and close range, the ratio of imaging magnification at the wide-angle end to that at the telephoto end can be made to coincide with the ratio of focal lengths there.

According to the embodiment thus configured, as shown in FIG. 9, regardless of the position of the object which is placed between infinity and close range, the ratio of imaging magnification at the wide-angle end to that at the telephoto end can be made to coincide with the ratio of focal lengths there. In this respect, it can be seen that this embodiment is greatly improved over the prior art which has a characteristic such as that shown in FIG. 10.

In the following, the zoom-lens drive control apparatus shown in FIG. 1 will be explained. This zoom-lens drive control apparatus comprises a CPU 11 for driving and controlling the zoom lens; a magnification designation operating section (volume) 12 for designating a zoom magnification; an object distance designation operating section (volume) 13 for designating a distance from the object; and A/D converting sections 14 and 15 which convert analog values designated by the operating sections into digital data and transmit thus converted data to the CPU 11. It further comprises a memory (ROM) 16 which stores two tables 17 and 18 for obtaining moving position data of the second lens group G2 and fourth lens group G4 on the basis of the magnification designation data and distance designation data from the CPU 11; and two drive mechanisms 19 and 20 which respectively move, on the basis of lens group drive signals outputted from the CPU 11 according to the moving position data of the second lens group G2 and fourth lens group G4 transmitted from the ROM 16, the two lens groups G2 and G4 to their predetermined moving positions.

The magnification designation operating section 12 and the object distance designation operating section 13 may be externally operable. Alternatively, for example, the object distance designation operating section 13 may be operated in synchronization with an auto-focus function.

Also, the first table (17) and second table (18) stored in the ROM 16 are configured as shown in FIGS. 2A and 2B, respectively.

Namely, as shown in FIG. 2A, the first table (17) is configured such that the moving position data for the second lens group G2 ($P_{1,0}, P_{1,1}, \ldots, P_{2,0,\infty}$) can be determined according to the individual magnification designation data and distance designation data; whereas, as shown in FIG. 2B, the second table (18) is configured such that the moving position data for the fourth lens group G4 ($Q_{1,0}, Q_{1,1}, \ldots, Q_{2,0,\infty}$) can be determined according to the individual magnification designation data and distance designation data.

In order to form these tables 17 and 18 for each zoom lens, which operates as mentioned above, the moving positions of the second lens group G2 and fourth lens group G4 which can attain the aimed object are determined beforehand, and thus determined moving position data are written into predetermined positions in each of the tables 17 and 18.

Specifically, the moving position data in the first and second tables (17 and 18) are set such that the fluctuation in imaging position is corrected when the respective movable lens groups G2 and G4 are disposed at their designated positions and the change in imaging position due to the change in object distance can be corrected, and further that the ratio of imaging magnification at the wide-angle end to that at the telephoto end upon zooming in the case where the object distance is finite coincides with the ratio of focal length of the whole lens system at the wide-angle end to that at the telephoto end in the case where the object distance is at infinity.

For example, in the case where the magnification designation data is 2× and the distance designation data is 2 m, $P_{2,2}$ is determined from the first table (17) shown in FIG. 2A as the moving position data for the second lens group G2, whereas $Q_{2,2}$ is determined from the second table (18) shown in FIG. 2B as the moving position data for the fourth lens group G4.

Each of the drive mechanism 19 for the second lens group G2 and the drive mechanism 20 for the fourth lens group G4 shown in FIG. 1 comprises a motor driver and a lens-driving motor.

In the following, with reference to FIG. 3, the process of drive control performed by the CPU 11 will be explained. First, the CPU 11 reads out the designated magnification value (magnification designation data) of the magnification designation operating section 12 (S1). Then, the CPU 11 reads out the designated distance value (distance designation data) of the object distance designation operating section 13 (S2).

Here, these designated magnification and distance values have been converted into magnification designation data and distance designation data, which are digital data, by the A/D converting sections 14 and 15, respectively.

Then, based on the read-out magnification designation data and distance designation data, the CPU 11 reads out the corresponding moving position data for the second lens group G2 from the first table (17) in the ROM 16 (S3). Namely, in the first table (17) shown in FIG. 2A, the moving position data for the second lens group G2 represented at the intersection between the row corresponding to the designated magnification data and the column corresponding to the designated distance data is read out.

Further, based on the read-out magnification designation data and distance designation data, the CPU 11 reads out the corresponding moving position data for the fourth lens group G4 from the second table (18) in the ROM 16 (S4). Namely, in the second table (18) shown in FIG. 2B, the moving position data for the fourth lens group G4 represented at the intersection between the row corresponding to the designated magnification data and the column corresponding to the designated distance data is read out.

Thus, the moving position data of the second lens group G2 and fourth lens group G4 taking account of two kinds of information concerning the magnification designation data and object distance designation data are read into the CPU 11.

Then, the CPU 11 transmits the second lens group drive signal corresponding to the moving position data for the second lens group G2 to the second lens group drive mechanism 19, and the fourth lens group drive signal corresponding to the moving position data for the fourth lens group G4 to the fourth lens group drive mechanism 20. Thereafter, the second and fourth lens group drive mechanisms 19 and 20 respectively move the second and fourth lens groups G2 and G4 to their positions designated by the above-mentioned moving position data (S5).

Accordingly, the amount of movement of the second lens group G2 from the wide-angle end to the telephoto end is greater when the object distance is at close range than when it is at infinity, whereas the fourth lens group G4 moves so as to correct the fluctuation in imaging position due to the movement of the second lens group G2 in each of these cases.

When the second lens group G2 and fourth lens group G4 are driven and controlled in this manner, they can be moved to positions where the ratio of imaging magnification at the telephoto end to that at the wide-angle end can coincide with the ratio of focal lengths there at any position of the object which is placed between infinity and close range.

FIG. 5 is a block diagram showing the zoom-lens drive control apparatus in accordance with a second embodiment of the present invention.

Also, FIG. 5 shows a zoom lens which is driven by this zoom-lens drive control apparatus. This zoom lens comprises, successively from the object side, a first lens group G1 having a positive refractive power as a whole, a second lens group G2 having a negative refractive power as a whole, a third lens group G3 having a negative refractive power as a whole, a stop 101, a fourth lens group G4 having a positive refractive power as a whole, and a fifth lens group G5 having a positive refractive power as a whole. While the first lens group G1, the third lens group G3, and the fifth lens group G5 are fixed, the second lens group G2 mainly having a power-changing function and the fourth lens group G4 mainly having a focus-adjusting function are made movable at the time of zooming.

A luminous flux emitted from this zoom lens forms an image on an imaging surface 102 by way of a three-color separating prism 103 disposed on the optical axis X between the fifth lens group G5 and the imaging surface 102, a filter for cutting infrared rays, a low-pass filter, and a CCD cover glass 104.

On the other hand, the zoom-lens drive control apparatus in accordance with this embodiment moves the second lens group G2 along the optical axis X so as to change the focal length f of the whole lens system, and moves the fourth lens group G4 along the optical axis X so as to correct the fluctuation in imaging position due to the movement of the second lens group G2.

Further, together therewith, the change in imaging position due to the change in object distance is corrected as the fourth lens group G4 is moved, and the total amount of movement of the second lens group G2 from the wide-angle end to the telephoto end is changed according to the object distance.

Namely, when the object distance is at infinity, the amount of movement of the second lens group G2 from the wide-angle end to the telephoto end is $a_1$. In this case, the lens is driven and controlled such that the fourth lens group G4 moves to a position which is closest to the image in the intermediate range of variable power whereas, at the telephoto end, it approaches the fixed third lens group G3. When the object distance is at close range, the amount of movement of the second lens group G2 from the wide-angle end to the telephoto end is $a_2$ which is greater than $a_1$. In this case, the lens is driven and controlled such that the fourth lens group G4 moves to a position which is closest to the image in the intermediate range of variable power whereas, at the telephoto end, it is driven and controlled so as to approach the fixed third lens group G3; while the distance between the two lens groups G3 and G4 is greater than that in the above-mentioned case where the object distance is at infinity.

Here, in cases where the object distance is between infinity and close range, the lens is driven and controlled such that the amount of movement of the second lens group G2 becomes a value between $a_1$ and $a_2$.

Thus, the amount of movement of the second lens group G2 from the wide-angle end to the telephoto end in the case where the object distance is at close range is greater than that in the case where the object distance is at infinity, while the fourth lens G4 is driven and controlled such that it is moved so as to correct the fluctuation in imaging position due to the movement of the second lens group G2 in each of these cases.

As the second lens group G2 and the fourth lens group G4 are driven and controlled in this manner, at any position of the object between infinity and close range, the ratio of imaging magnification at the wide-angle end to that at the telephoto end can be made to coincide with the ratio of focal lengths there.

According to the embodiment thus configured, like the first embodiment, as shown in FIG. 9, regardless of the position of the object which is placed between infinity and close range, the ratio of imaging magnification at the wide-angle end to that at the telephoto end can be made to coincide with the ratio of focal lengths there. In this respect, it can be seen that this embodiment is greatly improved over the prior art which has a characteristic such as that shown in FIG. 10.

In the following, the zoom-lens drive control apparatus shown in FIG. 5 will be explained. This zoom-lens drive control apparatus comprises a CPU 111 for driving and controlling the zoom lens; a magnification designation operating section (volume) 112 for designating a zoom magnification; an object distance designation operating section (volume) 113 for designating a distance from the object; a magnification adjustment operating section (volume) 121 for adjusting the zoom magnification; and an object distance adjustment operating section (volume) 122 for adjusting the distance from the object. It further comprises A/D converting sections 114, 115, 123, and 124 which convert analog values designated by the respective operating sections 112, 113, 121, and 122 into digital data and transmit thus converted data to the CPU 111; a memory (ROM) 116 which stores four tables 117, 118, 126, and 127 for obtaining moving position data of the second lens group G2 and fourth lens group G4 on the basis of the magnification designation data and distance designation data from the CPU 111; and two drive mechanisms 119 and 120 which respectively move, on the basis of lens group drive signals outputted from the CPU 111 according to the moving position data of the second lens group G2 and fourth lens group G4 transmitted from the ROM 116, the two lens groups G2 and G4 to their predetermined moving positions.

The above-mentioned operating sections 112, 113, 121, and 122 may be externally operable. Alternatively, for example, the object distance designation operating section 113 may be operated in synchronization with an auto-focus function.

Also, the first table (117), second table (118), third table (126), and fourth table (127) stored in the ROM 116 are configured as shown in FIGS. 6A to 6D, respectively.

Namely, as shown in FIG. 6A, the first table (117) is configured such that the moving position reference data for the second lens group G2 ($P_{1,0}, P_{1,1}, \ldots, P_{2,0,\infty}$) can be determined according to the individual magnification designation data and distance designation data; whereas, as shown in FIG. 6B, the second table (118) is configured such that the moving position reference data for the fourth lens group G4 ($Q_{1,0}, Q_{1,1}, \ldots, Q_{2,0,\infty}$) can be determined according to the individual magnification designation data and distance designation data.

In order to form these tables 117 and 118 for each zoom lens, which operates as mentioned above, the moving positions of the second lens group G2 and fourth lens group G4 which can attain the aimed object are determined beforehand on the basis of design values, and thus determined moving position reference data are written into predetermined positions in each of the tables 117 and 118.

Also, as shown in FIG. 6C, the third table (126) is configured such that the moving position adjustment data for the second lens group G2 ($R_{,0}, R_{1,1}, \ldots, R_{2,0,\infty}$) can be determined according to the individual magnification designation data and distance designation data; whereas, as shown in FIG. 6D, the fourth table (127) is configured such that the moving position adjustment data for the fourth lens group G4 ($S_{1,1}, S_{1,1}, \ldots, S_{2,0,\infty}$) can be determined according to the individual magnification designation data and distance designation data.

These tables 126 and 127 are used for correcting the above-mentioned two kinds of moving position reference data in view of the individual differences (errors) among actual units, which exist in the respective zoom lenses operating as mentioned above. In order to form these tables 126 and 127, the second and fourth lens groups G2 and G4 are actually moved so as to determine the adjustment data (error amount) for the above-mentioned reference data, and thus determined moving position adjustment data are written into predetermined positions in each of the tables 126 and 127.

Then, the moving position reference data for the second lens group G2 from the first table (117) and the moving position adjustment data for the second lens group G2 from the third table (126) are added together by the CPU 111 so as to yield the final moving position data for the second lens group G2. Similarly, the moving position reference data for the fourth lens group G4 from the second table (118) and the moving position adjustment data for the fourth lens group G4 from the fourth table (127) are added together by the CPU 111 so as to yield the final moving position data for the fourth lens group G4.

Specifically, the moving position reference data in the first table (117), the moving position reference data in the second table (118), the moving position adjustment data in the third table (126), and the moving position adjustment data in the fourth table (127) are set to their respective values such that the fluctuation in imaging position is corrected when the respective movable lens groups G2 and G4 are disposed at their designated positions and the change in imaging position due to the change in object distance can be corrected, and further that the ratio of imaging magnification at the wide-angle end to that at the telephoto end upon zooming in the case where the object distance is finite coincides with the ratio of focal length of the whole lens system at the wide-angle end to that at the telephoto end in the case where the object distance is at infinity.

For example, in the case where the magnification designation data is 2× and the distance designation data is 2 m, $P_{2,2}$ is determined from the first table (117) shown in FIG. 6A as the moving position reference data for the second lens group G2, $R_{2,2}$ is determined from the third table (126) shown in FIG. 6C as the moving position adjustment data for the second lens group G2, and these two kinds of data $P_{2,2}$ and $R_{2,2}$ are added together by the CPU 111, whereby the final moving position data ($P_{2,2}+R_{2,2}$) for the second lens group G2 is determined. Further, similarly, $Q_{2,2}$ is determined from the second table (118) shown in FIG. 6B as the moving position reference data for the fourth lens group G4, $S_{2,2}$ is determined from the fourth table (127) shown in FIG. 6D as the moving position adjustment data for the fourth lens group G4, and these two kinds of data $Q_{2,2}$ and $S_{2,2}$ are added together by the CPU 111, whereby the final moving position data ($Q_{2,2}+S_{2,2}$) for the fourth lens group G4 is determined.

Each of the drive mechanism 119 for the second lens group G2 and the drive mechanism 120 for the fourth lens group G4 shown in FIG. 5 comprises a motor driver and a lens-driving motor.

In the following, with reference to FIG. 7, the process of drive control performed by the CPU 111 will be explained. First, the CPU 111 reads out the designated magnification value (magnification designation data) of the magnification designation operating section 112 (S1). Then, the CPU 111 reads out the designated distance value (distance designation data) of the object distance designation operating section 113 (S2).

Here, these designated magnification and distance values have been converted into magnification designation data and distance designation data, which are digital data, by the A/D converting sections 114 and 115, respectively.

Then, based on the read-out magnification designation data and distance designation data, the CPU 111 reads out the corresponding moving position reference data for the second lens group G2 from the first table (117) in the ROM 116 (S3). Namely, in the first table (117) shown in FIG. 6A, the moving position reference data for the second lens group G2 represented at the intersection between the row corresponding to the designated magnification data and the column corresponding to the designated distance data is read out.

Further, based on the read-out magnification designation data and distance designation data, the CPU 111 reads out the corresponding moving position adjustment data for the second lens group G2 from the third table (126) in the ROM 116. Namely, in the third table (126) shown in FIG. 6C, the moving position adjustment data for the second lens group G2 represented at the intersection between the row corresponding to the designated magnification data and the column corresponding to the designated distance data is read out.

Thereafter, the CPU 111 adds the read-out moving position reference data and moving position adjustment data for the second lens group G2 together, thereby determining the final moving position for the second lens group G2 (S4).

Also, based on the read-out magnification designation data and distance designation data, the CPU 111 reads out the corresponding moving position reference data for the fourth lens group G4 from the second table (118) in the ROM 116 (S5). Namely, in the second table (118) shown in FIG. 6B, the moving position reference data for the fourth lens group G4 represented at the intersection between the row corresponding to the designated magnification data and the column corresponding to the designated distance data is read out.

Further, based on the read-out magnification designation data and distance designation data, the CPU 111 reads out the corresponding moving position adjustment data for the fourth lens group G4 from the fourth table (127) in the ROM 116. Namely, in the fourth table (127) shown in FIG. 6D, the moving position adjustment data for the fourth lens group G4 represented at the intersection between the row corresponding to the designated magnification data and the column corresponding to the designated distance data is read out.

Thereafter, the CPU 111 adds the read-out moving position reference data and moving position adjustment data for the fourth lens group G4 together, thereby determining the final moving position for the fourth lens group G4 (S6).

Thus, the moving position data for the second lens group G2 and fourth lens group G4, each of which is adjusted in view of two kinds of information composed of the magnification designation data and object distance designation data, are determined by the CPU 111.

Then, the CPU 111 transmits the second lens group drive signal corresponding to the moving position data for the second lens group G2 to the second lens group drive mechanism 119, and the fourth lens group drive signal corresponding to the moving position data for the fourth lens group G4 to the fourth lens group drive mechanism 120. Thereafter, the second and fourth lens group drive mechanisms 119 and 120 respectively move the second and fourth lens groups G2 and G4 to their positions designated by the above-mentioned moving position data (S7).

Accordingly, the amount of movement of the second lens group G2 from the wide-angle end to the telephoto end is greater when the object distance is at close range than when it is at infinity, whereas the fourth lens group G4 moves so as to correct the fluctuation in imaging position due to the movement of the second lens group G2 in each of these cases.

When the second lens group G2 and fourth lens group G4 are driven and controlled in this manner, they can be moved to positions where the ratio of imaging magnification at the telephoto end to that at the wide-angle end can coincide with the ratio of focal lengths there at any position of the object which is placed between infinity and close range.

In the following, the configuration and operating process for obtaining the moving position adjustment data for the second lens group G2 stored in the third table (126) and the moving position adjustment data for the fourth lens group G4 stored in the fourth table (127) in this embodiment will be explained.

Namely, as shown in FIG. 5, the above-mentioned apparatus is provided with the magnification adjustment operating section (volume) 121 for effecting the magnification adjustment operation; the distance adjustment operating section (volume) 122 for effecting the distance adjustment operation; the A/D converting sections 123 and 124 for digitally converting the respective moving position adjustment values set by the operating sections 121 and 122 and transmitting thus converted values to the CPU 111; and an adjusting switch 125 for switching the operation between this adjustment data setting mode and the normal operation mode.

The operation in this adjustment data setting mode is normally effected in the manufacturing process before the product is shipped or at the time of its maintenance and inspection. Accordingly, the above-mentioned configuration for effecting the operation in this adjustment data setting mode may not always be incorporated in the apparatus of this embodiment but may be configured so as to be connectable to the CPU 111 when necessary.

In the following, the process of the operation in the above-mentioned adjustment data setting mode will be explained as being exemplified by an adjustment data setting operation for effecting in-focus zooming throughout the whole region of focal length from the wide-angle end to the telephoto end when the subject distance is at infinity. Namely, as shown in the flow chart of FIG. 8, first, the adjusting switch 25 is turned on, so that the operation mode shifts from the normal operation mode to this adjustment data setting mode (S11).

Then, the object distance designation operating section 113 designates the infinity position (S12), and the magnification designation operating section 112 designates the wide-angle end (S13). Accordingly, the second lens group G2 and the fourth lens group G4 are moved to their designed positions where the object distance is at infinity and the focal length is at the wide-angle end.

Thereafter, while optical measurement means such as a collimator is used, the magnification adjustment operating section 121 is operated so as to finely adjust the position of the second lens group G2 such that the lens system has the designed value of focal length (S14).

Similarly, the object distance adjustment operating section 122 is operated so as to finely adjust the fourth lens group G4 such that the lens system attains the best focus (S15).

Then, it is judged whether the designed value of focal point and the best focus are attained or not (S16). If not, the process returns to S14 so as to repeat the operations of S14 and S15; otherwise the next step is taken.

The operations of S14 and S15 are repeated since, when one of these operations is performed, the other changes.

Subsequently, the amount of adjustment in the magnification adjustment operating section 121 which has been operated for attaining the designed value of focal length and the amount of adjustment in the distance adjustment operating section 122 which has been operated for attaining the best focus in the foregoing processing concerning the wide-angle end are read into the CPU 111 respectively by way of the A/D converting sections 123 and 124, and then are stored in predetermined positions of the third table and fourth table in the ROM 116 as moving position adjustment data for the respective lens groups G2 and G4 (S17).

Thereafter, it is judged whether or not the telephoto end has been designated by the magnification designation operating section 112 (S18). If it has been designated, the adjustment data setting mode is terminated; otherwise the process shifts to the next step.

Then, when it is clarified that the telephoto end has not been designated by the magnification designation operating section 112, while the setting at the object distance designation operating section 113 is kept as it is, the telephoto end is designated by the magnification designation operating section 112 (S19), and the above-mentioned operations of S14 to S17 are repeated.

Accordingly, the amount of adjustment in the magnification adjustment operating section 121 which has been operated for attaining the designed value of focal length and the amount of adjustment in the distance adjustment operating section 122 which has been operated for attaining the best focus in the foregoing processing concerning the telephoto end are read into the CPU 111 respectively by way of the A/D converting sections 123 and 124, and then are stored in predetermined positions of the third table and fourth table in the ROM 116 as moving position adjustment data for the respective lens groups G2 and G4.

Here, when the operation in the normal operation mode is to be performed thereafter, the adjusting switch 125 is turned off, whereby the reading operation from the ROM 116 is made effective.

In the third table shown in FIG. 6C and the fourth table shown in FIG. 6D, one adjustment data value is stored with reference to one reference data value in the first and second tables. In order to form such third and fourth tables, the designated magnification values are successively set at a number of points within the range from the wide-angle end to the telephoto end, the designated object distance values are set for each of thus set magnification values within the range from the infinity position to the close position, and the above-mentioned two kinds of moving position adjustment data are obtained at each set value.

Also, for example, only the adjustment data concerning the infinity position and close position at the wide-angle end and telephoto end may be stored as the adjustment data in the third and fourth tables, whereas the adjustment data for the other positions may be computed by interpolation on the basis of thus stored data. In this case, the time and labor for picking up the adjustment data and the memory capacity for the tables can be reduced.

Here, as the memory for storing these tables, rewritable ROM, RAM backed up by a battery, variable resistor, and the like can be used in place of the above-mentioned ROM.

Without being restricted to the foregoing embodiments, the zoom-lens drive control apparatus of the present invention can be modified in various manners.

Figure 4B:
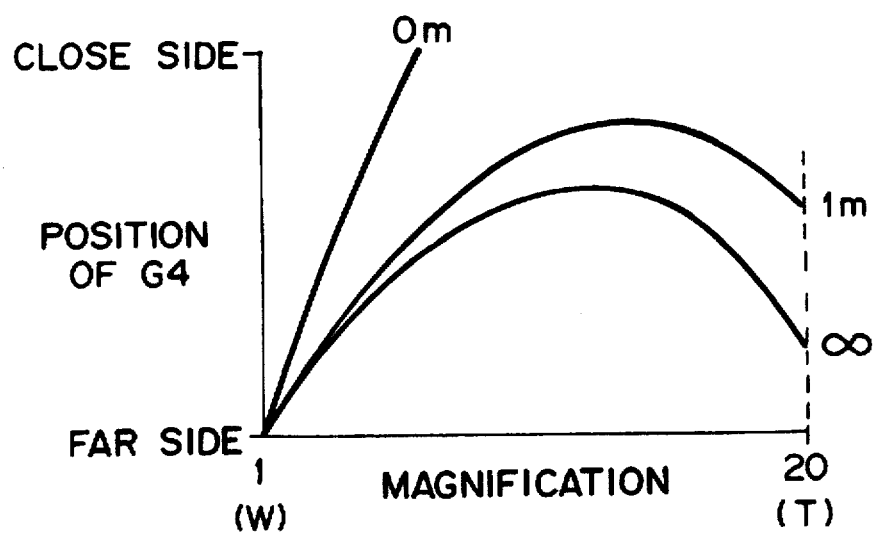

For example, though the moving position data of the two lens groups G2 and G4 are determined from the two tables 17 and 18 or four tables 117, 118, 126, and 127 according to the magnification designation data and distance designation data in the foregoing embodiments, they may be determined by predetermined operation expressions according to the magnification designation data and distance designation data as well. As these operation expressions, for example, in the first embodiment, the operation expression representing the curves shown in FIG. 4A may be used for the second lens group G2, while the operation expression representing the curves shown in FIG. 4B may be used for the fourth lens group G4.

Further, in the second embodiment, the reference data of the first and second tables may be rewritten directly so as to take account of the adjustment data obtained by the adjustment data setting mode.

Also, the configuration of the apparatus in the foregoing embodiments can be altered appropriately.

Further, in the zoom lens to be driven and controlled, the number and order of lens groups, the number and form of lens sheets constituting each lens group, and the like can be selected appropriately.

Since the zoom-lens drive control apparatus in accordance with the first embodiment of the present invention is provided with means for outputting positional data of movable lens groups which can attain the moving position data of respective movable lens groups according to the designated magnification data and object distance data, it can smoothly and easily perform the drive control operation suitable for a zoom lens in which not only the focus-adjusting movable lens but also the power-changing movable lens is moved at the time of focus adjustment.

In the second embodiment of the present invention, the zoom-lens drive control apparatus is provided with means for outputting reference positional data of movable lens groups which can attain the moving position reference data of respective movable lens groups according to the designated magnification data and object distance data, as well as means for outputting positional adjustment data of movable lens groups which can attain the moving position adjustment data of the respective movable lens groups corresponding to the individual differences of the respective lens units. The reference data and adjustment data for each movable lens group outputted from these output means are operated, and each movable lens group is moved to its correct moving position corresponding to the individual lens unit. Accordingly, the apparatus can smoothly, easily, and correctly perform the drive control operation suitable for a zoom lens in which not only the focus-adjusting movable lens but also the power-changing movable lens is moved at the time of focus adjustment.

What is claimed is:

1. A zoom-lens drive control apparatus for a zoom lens including a power-changing movable lens group and a focus-adjusting movable lens group, said zoom lens being driven and controlled such that the total amount of movement of the power-changing lens group from a wide-angle end to a telephoto end changes according to a distance from a subject object and that the total amount of movement of the focus-adjusting movable lens group from a near side to an infinity side changes according to a set value of variable power, said zoom-lens drive control apparatus comprising:

first data output means for outputting data concerning a position to which said power-changing movable lens group is to be moved, according to a designated value of variable power and a designated value of object distance;

second data output means for outputting data concerning a position to which said focus-adjusting movable lens group is to be moved, according to the designated value of variable power and the designated value of object distance;

lens drive control means which drives and controls, based on the output data from said first and second output means, each of said movable lens groups such that said movable lens groups are moved to data positions thereof; and wherein said zoom lens comprises, successively from the object side, a first lens group, a second lens group, a third lens group, a fourth lens group, and a fifth lens group; wherein said second lens group is moved in an optical axis direction so as to chance the focal length of the whole lens system, and said fourth lens group is moved in the optical axis direction so as to correct fluctuation in imaging position and correct the chance in imaging position due to change in object distance; and wherein, as the distance from the subject object increases, the amount of movement of said second lens group from the wide-angle end to the telephoto end is decreased such that the ratio in imaging magnification at the wide-angle end to that at the telephoto end upon zooming in cases where the object distance is finite coincides with the ratio of focal length of the whole lens system at the wide-angle end to that at the telephoto end in cases where the object distance is at infinity.

2. A zoom lens drive and control apparatus according to claim 1. Wherein said zoom lens comprises, successively from the object side, a first lens group having a positive refractive power, a second lens group having a negative refractive power, a third lens group having a negative refractive power, a fourth lens group having a positive refractive power, and a fifth lens group having a positive refractive power.

3. A zoom-lens drive and control apparatus according to claim 1, wherein each of said data output means is composed of a table stored in a memory.

4. A zoom-lens drive and control apparatus according to claim 1, wherein each of said data output means is composed of a predetermined operation expression.

5. A zoom-lens drive control apparatus for a zoom lens including a power-changing movable lens group and a focus-adjusting movable lens group, said zoom lens being driven and controlled such that the total amount of movement of the power-changing lens group from a wide-angle end to a telephoto end changes according to a distance from a subject object and that the total amount of movement of the focus-adjusting movable lens group from a near side to an infinity side changes according to a set value of variable power.

said zoom-lens drive control apparatus comprising:

first reference data output means for outputting reference data concerning a position to which said power-changing movable lens group is to be moved, according to a designated value of variable power and a designated value of object distance;

first adjustment data output means for outputting adjustment data concerning the position to which said power-changing movable lens group is to be moved and corresponding to an individual difference of said zoom lens, according to the designated value of variable power and the designated value of object distance;

second reference data output means for outputting reference data concerning a position to which said focus-adjusting movable lens group is to be moved, according to the designated value of variable power and the designated value of object distance;

second adjustment data output means for outputting adjustment data concerning the position to which said focus-adjusting movable lens group is to be moved and corresponding to the individual difference of said zoom lens, according to the designated value of variable power and the designated value of object distance;

arithmetic means for operating the reference data for the power-changing movable lens group outputted from said first reference data output means and the adjustment data for the power-changing movable lens group outputted from said first adjustment data output means and operating the reference data for the focus-adjusting movable lens group outputted from said second reference data output means and the adjustment data for the focus-adjusting movable lens group outputted from said second adjustment data output means; and lens drive control means which drives and controls, based on the operated output data from said arithmetic means, each of said movable lens groups such that they are moved to data positions thereof.

6. A zoom-lens drive and control apparatus according to claim 5, wherein said zoom lens comprises, successively from the object side, a first lens group having a positive refractive power, a second lens group having a negative refractive power, a third lens group having a negative refractive power, a fourth lens group having a positive refractive power, and a fifth lens group having a positive refractive power; wherein said second lens group is moved in an optical axis direction so as to change the focal length of the whole lens system, and said fourth lens group is moved in the optical axis direction so as to correct fluctuation in imaging position and correct the change in imaging position due to change in object distance; and wherein, as the distance from the subject object increases, the amount of movement of said second lens group from the wide-angle end to the telephoto end is decreased such that the ratio in imaging magnification at the wide-angle end to that at the telephoto end upon zooming in cases where the object distance is finite coincides with the ratio of focal length of the whole lens system at the wide-angle end to that at the telephoto end in cases where the object distance is at infinity.

7. A zoom-lens drive and control apparatus according to claim 5, wherein each of said data output means is composed of a table stored in a memory.

8. A zoom-lens drive and control apparatus according to claim 5, wherein each of said data output means is composed of a predetermined operation expression.

* * * * *